United States Patent [19]

Schatz

[11] Patent Number: 4,581,205
[45] Date of Patent: Apr. 8, 1986

[54] CLOSED CYCLONE FCC SYSTEM WITH PROVISIONS FOR SURGE CAPACITY

[75] Inventor: Klaus W. Schatz, Skillman, N.J.

[73] Assignee: Mobil Oil Corporation, New York, N.Y.

[21] Appl. No.: 529,451

[22] Filed: Sep. 6, 1983

[51] Int. Cl.$^4$ .................. B01J 8/18; B01D 45/12; B04C 5/26

[52] U.S. Cl. .................. 422/113; 55/432; 208/113; 208/161; 422/112; 422/144; 422/145; 422/146

[58] Field of Search .............. 422/112, 113, 144, 146, 422/145; 208/113, 161, 164; 137/527, 545; 55/432

[56] References Cited

U.S. PATENT DOCUMENTS

| | | |
|---|---|---|
| 2,464,812 | 3/1949 | Johnson . |
| 2,612,433 | 9/1952 | Nicolai et al. . |
| 2,838,062 | 6/1958 | Held et al. .................. 137/382 |
| 2,838,063 | 6/1958 | Weits et al. .................. 137/382 |
| 2,838,065 | 6/1958 | Held et al. .................. 137/521 |
| 2,862,786 | 6/1955 | Trainer . |
| 2,901,331 | 8/1959 | Held et al. . |
| 3,007,778 | 11/1961 | Wood et al. . |
| 3,355,380 | 11/1967 | Luckenbach .................. 208/153 |
| 3,661,799 | 5/1972 | Cartmell . |
| 3,667,196 | 6/1972 | Koenecke .................. 55/312 |
| 3,826,738 | 7/1974 | Zenz .................. 208/153 |
| 4,118,338 | 10/1978 | Gross et al. . |
| 4,219,407 | 8/1980 | Haddad et al. .................. 208/151 |
| 4,351,275 | 9/1982 | Bhojwani et al. .................. 122/7 R |
| 4,356,151 | 10/1982 | Woebcke et al. .................. 422/145 |
| 4,385,985 | 5/1983 | Gross et al. .................. 208/113 |

FOREIGN PATENT DOCUMENTS 0086580 8/1983 European Pat. Off. .

Primary Examiner—Barry S. Richman
Assistant Examiner—William R. Johnson
Attorney, Agent, or Firm—Alexander J. McKillop; Michael G. Gilman; Dennis P. Santini

[57] ABSTRACT

A fluid catalytic cracking (FCC) process and apparatus containing a reactor riser zone and radially extending sidearms as the first catalyst-hydrocarbon product separation means. Hydrocarbon products separated in the sidearms are conducted through an enclosed passageway to a secondary separation means, such as a cyclone. The catalyst is also conducted through the enclosed passageway to a stripping apparatus, wherein entrained hydrocarbons are removed therefrom. The enclosed passageway contains a means for accommodating sudden surges of catalyst flow and increased pressure, e.g., a trickle valve.

14 Claims, 3 Drawing Figures

CLOSED CYCLONE FCC SYSTEM WITH PROVISIONS FOR SURGE CAPACITY

BACKGROUND OF THE INVENTION

1. Field of the Invention

This invention relates to the separation of the catalyst phase from the gasiform phase in a fluidized catalytic cracking unit (FCC). More particularly, it relates to improvements in separating the catalyst phase from the gasiform phase, as the suspension comprising both phases is discharged from a riser conversion zone outlet, to minimize or substantially eliminate post-riser conversion zone cracking.

2. Description of the Prior Art

The field of catalytic cracking, particularly fluid catalytic cracking, has undergone significant development improvements due primarily to advances in catalyst technology and product distribution obtained therefrom. With the advent of high activity catalysts and particularly crystalline zeolite cracking catalysts, new areas of operating technology have been encountered requiring even further refinements in processing techniques to take advantage of the high catalyst activity, selectivity and operating sensitivity.

Of particular concern in this field has been the development of methods and systems for separating gasiform products from fluidizable catalyst particles, particularly from a high activity crystalline zeolite cracking catalysts, under more efficient separating conditions so as to reduce the overcracking of conversion products and promote the recovery of desired products of a hydrocarbon conversion operation. However, present day cyclonic equipment often permits an undesired extended residence time of the product vapor within a large reactor vessel. This extended residence time causes a loss of the desired product yield of up to about 4 percent through non-selective thermal cracking. Recent developments in this art have been concerned with the rapid separation and recovery of entrained catalyst particles from gasiform products in a short contact time riser hydrocarbon conversion operation.

The hydrocarbon conversion catalyst usually employed in an FCC installation is preferably a high activity crystalline zeolite catalyst of a fluidizable particle size which is transferred in suspended or dispersed phase condition generally upwardly through one or more riser conversion zones providing a hydrocarbon residence time in each conversion zone in the range of 0.5 to about 10 seconds, and more usually less than about 8 seconds. High temperature riser hydrocarbon conversions of at least 1000° F. at 0.5 to 4 seconds hydrocarbon residence time in contact with the catalyst in the riser are desirable for some operations before initiating separation of vaporous hydrocarbon product materials from the catalyst. Rapid separation of catalyst from hydrocarbons discharged from a riser conversion zone is particularly desirable for restricting hydrocarbon conversion time. During the hydrocarbon conversion step, carbonaceous deposits accumulate on the catalyst particles and the particles entrain hydrocarbon vapors upon removal from the catalyst conversion step. The entrained hydrocarbons are subjected to further contact with the catalyst until they are removed from the catalyst by mechanical means and/or stripping gas in a separate catalyst stripping zone. Hydrocarbon conversion products separated from the catalyst and stripped materials are combined and passed to a product fractionation step. Stripped catalyst containing deactivating amounts of carbonaceous material, hereinafter referred to as coke, is then passed to a catalyst regeneration operation.

Various processes and mechanical means have been employed heretofore to effect rapid separation of the catalyst phase from the hydrocarbon phase at the termination of the riser cracking zone, to minimize contact time of the catalyst with cracked hydrocarbons.

Cartmell, U.S. Pat. No. 3,661,799, discloses a process for catalytic conversion of petroleum feedstocks wherein the fluidized mixture of the cracking catalyst and cracked feedstock leaves a vertically-disposed reactor section and enters a cyclone separator, placed in a separate stripper vessel, through a conduit. The conduit contains an annulus which allows an inert stripping gas and associated stripped vapors to pass into the cyclone separator.

Anderson, et al., U.S. Pat. No. 4,043,899, disclose a method for rapid separation of a product suspension comprising fluidized catalyst particles and the vaporous hydrocarbon product phase by discharging the entire suspension directly from the riser conversion zone into a cyclonic separation zone which provides cyclonic stripping of the catalyst after it is separated from the hydrocarbon vapors. In the method of Anderson et al., the cyclone separator is modified to include an additional downwardly extending section comprising a lower cyclone stage. In this arrangement, catalyst separated from the gasiform material in the upper stage slides along a downwardly sloping baffle to the lower cyclone where stripping steam is introduced to further separate entrained hydrocarbon products from the catalyst recovered from the upper cyclone. The steam and the stripped hydrocarbons are passed from the lower cyclone through a concentric pipe where they are combined with the hydrocarbon vapors separated in the upper cyclone. The separated and stripped catalyst is collected and passes from the cyclone separator by conventional means through a dipleg. This process requires that the entire volume of catalyst, gasiform phase and stripping steam pass through the cyclone separator, which means that this equipment must be designed to efficiently handle not only a large vapor volume but also a large quantity of solid particles.

Myers et al., U.S. Pat. No. 4,070,159, provide a separation means whereby the bulk of the solids is discharged directly into the settling chamber without passing through a cyclone separator. In this apparatus, the discharge end of the riser conversion zone is in open communication with the disengaging chamber such that the catalyst discharges from the riser in a vertical direction into the disengaging chamber which is otherwise essentially closed to the flow of gases. The cyclone separation system is in open communication with the riser conversion zone by means of a port located upstream from but near the discharge end of the riser conversion zone. A deflector cone mounted directy above the terminus of the riser causes the catalyst to be directed in a downward path so as to prevent the catalyst from abrading the upper end of the disengaging vessel. The cyclone separator is of the usual configuration employed in a catalytic cracking unit to separate entrained catalyst particles from the cracked hydrocarbon products so that the catalyst passes through the dipleg of the cyclone to the body of the catalyst in the lower section of the disengaging vessel and the vaporous phase is directed from this vessel to a conventional fractionation unit. There is essentially no net flow of gases within the disengaging vessel beyond that resulting from a moderate amount of steam introduced to strip the catalyst residing in the bottom of the disengaging vessel.

Haddad et al., U.S. Pat. No. 4,219,407, disclose the separation of the catalyst from the gasiform cracked products in a fashion which permits effective steam stripping of the catalyst. The suspension of catalyst and gasiform material is discharged from the riser conversion zone outwardly through radially extending passageways, or arms, which terminate in a downward direction. Catalyst stripping zones, or strippers, are located beneath the terminus of each of the radially extending passageways. Each stripper consists of a vertical chamber open at the top and the bottom with downwardly sloping baffles located within the chamber so as to cause the catalyst to flow in a discontinuous manner countercurrently to upwardly flowing stripping steam introduced at the lower end of the stripping chamber. The radially extending arms are each provided with a curved inner surface and confining sidewalls to impart a cyclonic concentration of catalyst particles promoting a forced separation thereof from the hydrocarbon vapors. The separation of the catalyst from the vapors is basically achieved through rapid changes in the direction of flow of the catalyst and the vapors. Thus the cyclonic collection and concentration of catalyst particles is used to reverse the flow of separated catalyst such that it is concentrated as a downwardly confined stream which discharges generally downwardly and into the open upper end of the catalyst stripping chamber. A vapor disengaging space is provided between the discharge end of the radially extending arms and the top of the catalyst strippers to promote the rapid removal of separated vapors from the catalyst. The separated vapors pass upwardly through the disengaging vessel to the open inlet of a cyclone separator which removes entrained catalyst from the gasiform material for return through a dipleg to the body of steam stripped catalyst while the separated vaporous material passes to a fractionation unit. The hydrocarbon product, as it passes within the disengaging vessel from the discharge of the radially extending arms to the cyclone separator, travels in a random fashion and is exposed to catalytic reaction temperatures which may cause undesirable side reactions and thermal cracking before these vapors enter a quench zone in the main fractionator of the fluid cracking unit.

Haddad et al., allowed U.S. patent application, Ser. No. 400,843, filed July 22, 1982, now U.S. Pat. No. 4,404,095, issued Sept. 11, 1983, disclose an FCC reactor comprising a riser with radially extending sidearms as the first catalyst-hydrocarbon separation means. The sidearms force the suspension of the catalyst and the hydrocarbons to suddenly change the direction of flow from the vertical to the horizontal thereby forcing preliminary separation of the gaseous hydrocarbons from the solid catalyst particles. The catalyst particles fall in a downward direction, to a stripping means, while the hydrocarbons, with some entrained catalyst particles, proceed to a secondary separation means, such as a cyclone. The sidearms and the secondary separation means are enclosed by a vertical conduit to prevent random uncontrolled thermal cracking of the hydrocarbons. However, no means are provided in the apparatus and process of this Haddad et al. patent application for accommodating a sudden increase in pressure and the accompanying sudden increased rate of flow of the catalyst. Such unexpected increased pressure and the rate of flow of the cracking catalyst may be caused, for example, by mechanical malfunctions of equipment or by the vaporization of liquid water which may be introduced into the system with the hydrocarbon feed, or by unit pressure upsets.

It is a primary object of this invention to provide an improved process and apparatus for rapidly separating cracking catalyst from gasiform material and to provide an effective means of improving the ability of the FCC system to tolerate sudden system pressure increases and the accompanying surges in the catalyst rate of flow.

It is another object of this invention to provide an improved means for separating cracking catalyst from gasiform material in a fluid catalytic cracking (FCC) process.

It is a further object of this invention to provide a process and an apparatus for separating cracking catalyst from gasiform material whereby the length of time the gasiform material is subjected to high temperature after separation from the bulk of the catalyst is minimized so as to reduce overcracking of the cracked products.

SUMMARY OF THE INVENTION

An FCC process and apparatus comprising a closed cyclone system for separating the catalyst from cracked hydrocarbon feed after the mixture of catalyst and feed exits the FCC cracking zone, e.g., FCC riser, is equipped with a means for providing a surge capacity to accommodate a sudden increased rate of flow of the catalyst stream. In the FCC process and apparatus of the present invention, the first catalyst-hydrocarbon feed separation means comprises a radially-extending restricted passageway means, or at least two sidearms, which accomplishes a preliminary separation of the catalyst from the products of the reaction by centrifugal forces in the curvature of the sidearms. Most of the catalyst stream is then directed to a disengaging zone, e.g., a stream stripper, placed below the radially-extending passageways, and the hydrocarbon product, along with a minor proportion of entrained catalyst fines, is directed to a cyclone separation means placed downstream of the radially-extending passageway. A enclosed, vertically-positioned conduit surrounds the sidearms and connects the sidearms with the disengaging zone and with the cyclone separation means. Both, the catalyst stream and the hydrocarbon product, after leaving the sidearms, are conducted in the enclosed conduit from the sidearms to the disengaging zone and to the cyclone separation means, respectively. The enclosed conduit substantially reduces undesirable post-riser thermal cracking of the hydrocarbons by reducing the residence time in the surrounding vessel, and thereby minimizing the production of light gases and coke. The surge capacity means is provided in the enclosed conduit.

DETAILED DESCRIPTION OF THE INVENTION

Figure 1:
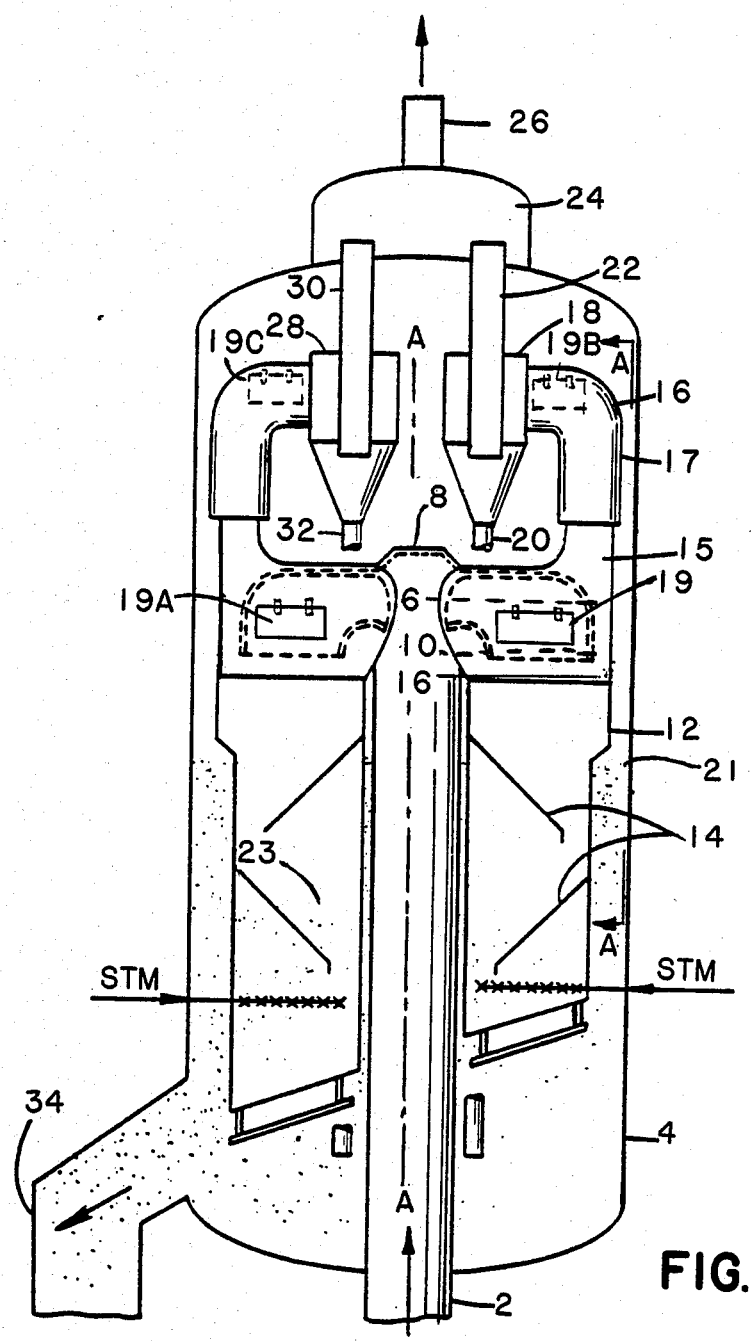
FIG. 1 is a schematic representation of a side view of a fluid catalytic cracking (FCC) reactor of the present invention.

The means for providing surge capacity to accommodate a sudden increased rate of flow of the catalyst stream can be, for example, a trickle valve which is positioned in the vertically disposed elongated restricted passageway, or an enclosed conduit surrounding the sidearms and steam stripper, at an elevation which is substantially opposite to and corresponding to the opening of the sidearms, or downstream of that point, or in both locations (e.g., see FIG. 1). Therefore, in the event of a sudden unexpected surge of increased pressure and of the increased catalyst volume flow, the surge capacity means allows excess catalyst to exit the enclosure surrounding the sidearms, and the excess catalyst is deposited in the bottom of the reactor vessel. The provision of the surge capacity means prevents cyclone dipleg flooding and large catalyst carryover from the FCC reactor to the main fractionation column, both of which might occur without the surge capacity means in case of the surge conditions. In this connection, the term increased rate of catalyst flow, as used herein and in the appended claims, designates a short term 2 to 20-fold increase of the steady state flow rate of the catalyst through the sidearms caused by operational upsets. Similarly, the term sudden increase in pressure designates the pressure increase inside the enclosed conduit of 2-10 psi, as compared to the steady state operating conditions. In the most preferred embodiment, the bottom portion of the surge capacity means is elevated with respect to the surface of the enclosure surrounding the sidearms in order to provide an opportunity for steam, or other gases such as steam and hydrocarbon mixtures, to enter the inside of the enclosure for the purpose of preventing coke build-up along the edges of the surge capacity means which could render the surge capacity means inoperational. The bottom of the surge capacity means can be elevated, for example, by providing a serrated edge spacer in the wall of the enclosed conduit, which supports the bottom of the surge capacity means in a spaced relationship with respect to the enclosure and allows for the gas from the stripper, e.g., steam and stripped hydrocarbons, to enter the enclosure. The remaining portion of the stripper gas and of the stripped hydrocarbons is conducted through a conduit carrying spent catalyst to the regenerator vessel.

The invention will now be described in connection with one specific embodiment thereof illustrated in FIGS. 1-3. This embodiment, however, is not to be construed as a limitation on the scope of the invention.

Figures 2, 3:
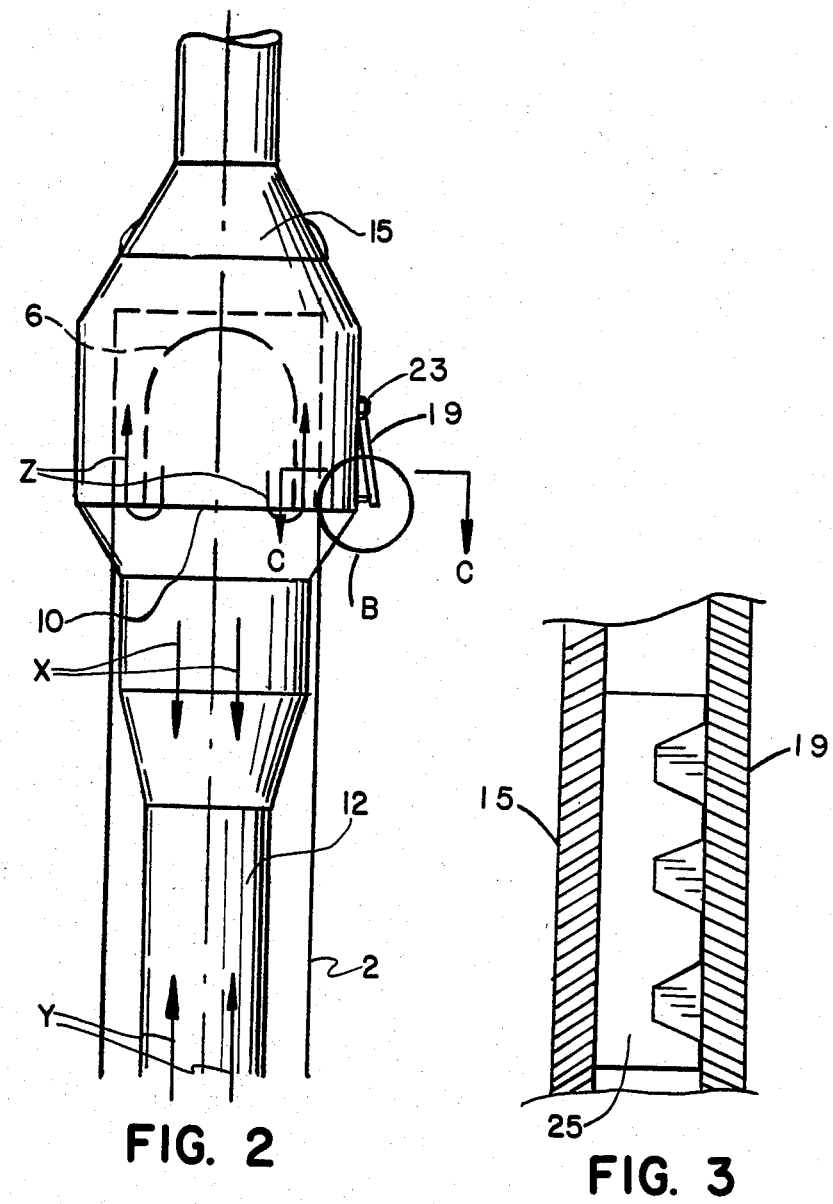
FIG. 2 is the front view of the FCC reactor of the present invention, taken along the axis A—A of FIG. 1.
FIG. 3 is an illustration of the detail of Section C—C of the circled area B in FIG. 2.

The basic design of the apparatus and process of FIGS. 1-3 is essentially the same as that diclosed in U.S. Pat. No. 4,219,407 to Haddad et al., issued Aug. 26, 1980, and in a U.S. Pat. No. 4,404,095, issued Sept. 11, 1983, except, of course, for the novel features of the present invention. The entire contents of the aforementioned U.S. Pat. No. 4,219,407 and of the patent application are incorporated herein by reference. Referring to FIG. 1, there is shown a reactor vessel 4 containing the upper end of riser hydrocarbon conversion zone 2. The riser terminates in an upper intermediate portion of vessel 4 with a horizontal sidearm 6, also referred to herein as a radially extending restricted passageway or radial passageway. Such passageway extends generally horizontally outwardly from the upper capped end 8 of riser 2. The bottom side of radial passageway 6 is in open communication with the passageway 16. The opening 10 of the passageway points in the downward direction. Positioned below the opening is a catalyst collecting and stripping vessel 12 provided with a plurality of downward sloping baffles 14 to allow stripping steam, which enters at the lower end of vessel 12, to intimately contact downwardly cascading catalyst. Vessel 12 has an open upper end enlarged to provide a funnel shaped collection zone for the catalyst discharged from radial passageway 6. The bottom end of vessel 12 is also open-ended to permit the stripped catalyst to pass to the body of stripped catalyst collected in the lower end of vessel 4.

The lower end of the radial passageway 6 is in direct fluid communication with an elongated restricted passageways 15 and 16 which, in turn, are in direct fluid communication with the inlet of a cyclone separator 18. Passageways 15 and 16 provide the gasiform material with a means for a rapid transfer from the radially extending passageway to the cyclone separator, while at the same time assuring that substantially no opportunity exists for post-riser thermal cracking of the hydrocarbons exiting from the passageway 6. Cyclone separator 18 is provided with a conventional dipleg 20 to return separated solid catalyst particles to the body of catalyst in the lower portion of vessel 4. Vapor outlet 22 conducts the separated vapor directly to plenum chamber 24 for removal from vessel 4 through line 26 for passage to a downstream fractionation equipment, not shown in the drawing. At least a portion of the stripping steam, which may flow downwardly in the stripping vessel, together with some of the hydrocarbons stripped from the catalyst, flows from the bottom of stripping vessel 12 and passes to the upper portion of vessel 4, wherein it enters passageways 15 and 15A through valves 19 and 19A, discussed below. Cyclone 28 is also provided with a conventional dipleg 32 which delivers separated catalyst particles to the body of catalyst in the lower section of vessel 4. The catalyst in the lower section of vessel 4 forms a bed whose upper boundary is indicated at the level 21. In contrast, the catalyst in the stripping vessel 12 builds up to the lower level 23. Vapor outlet 30, similar to the outlet 22, conducts the vapor separated in cyclone 28 to a plenum chamber 24 and subsequently to the conduit 26 for delivery to a downstream fractionation unit.

The open lower portion 10 of radial passageway 6 is in open communication with restricted passageway 16 which completely encloses the sidearms 6 and which provides direct fluid communication between the inlet of cyclone separator 18 and sidearms 6. Restricted passageway 16 consists of a lower portion 15 and an upper portion 17, both portions being connected by a conventional slip joint, not shown in the drawing for clarity. The passageway 16 is completely enclosed to provide a direct passage from open end 10 to cyclone 18. Therefore, the passageway 16 completely surrounds and contains radially extending restricted passageways 6 in spaced relationship thereto and is connected to the top of stripping vessel 12 and the inlet of cyclone 18. Passageway 16 provides a means for rapid transfer of the gasiform material, exiting radial passageways 6, and of the stripping steam and stripped hydrocarbons leaving the top of stripping vessel 12 directly to cyclone separator 18. Two trickle valves 19 and 19A are provided in the portion 15 of the conduit 16 to provide a means of accommodating sudden surges of catalyst flow through the sidearms 6. Additional trickle valves may be provided on the opposite sides or at any other point of the periphery of the portion 15 of the conduit 16 at the elevation similar to that of the valves 19 and 19A. Alternatively, the trickle valves 19B and 19C may be positioned only in the portion 17 of the conduit 16, as shown in phantom lines in FIG. 1. In yet another embodiment, four or more trickle valves may be provided in the conduit 16. In this embodiment, two trickle valves 19 and 19A are provided in the portion 15 and two trickle valves 19B and 19C are provided in the portion 17 of the conduit 16. It will be obvious to those skilled in the art that one or more of the trickle valves 19, 19A, 19B or 19C may be placed on the opposite sides of the portions 15 or 17 of the conduit 16, i.e., at the location 180° from the location shown in FIG. 1. Alternatively, the trickle valves 19, 19A, 19B and 19C may be supplemented by one or more additional trickle valves placed on the opposite sides of the portions 15 and 17 of the conduit 16. The trickle valves are sized to accommodate surges of up to 20 times of the steady rate of catalyst flow.

FIG. 2 illustrates the construction of valve 19, and it will be apparent to those skilled in the art that other valves may be constructed in a similar manner.

As understood by those skilled in the art, FIG. 2 shows how concentrated catalyst passes along the curved surface of the radial passageway 6 into the open upper end of stripping vessel 12, as illustrated by arrows X in FIG. 2. The gasiformed part of the suspension comprising hydrocarbon vapors, thus centrifugally separated from entrained catalyst particles in the disengaging space provided between opening 10 of passageway 6 and vessel 12, moves out from under radial extending restricted passageway 6 into restricted passageway 15, as illustrated by arrows Z, where they are joined by stripped hydrocarbons and stripping steam leaving the top of stripping vessel 12, as illustrated by arrows Y. These flows X, Y and Z resemble flows of catalyst, steam and hydrocarbon vapors as in FIG. 3 of U.S. Pat. No. 4,404,095 to Haddad et al., discussed above.

The trickle valve 19 is supported by ring hinges 23 shown in FIG. 2. The bottom portion of the plate 19 of the trickle valve leans against the serrated edge 25 shown in FIG. 3. The serrated edge is attached to the portion 15 of the restricted passageway 16. In this manner, a portion of steam from the bottom of stripper 12, along with stripped hydrocarbons, is able to enter the enclosed passageway 16 and cyclones 18 and 28. The function of this portion of the steam is to prevent coke build-up on the edge of plate 19 which could partially or totally seal shut trickle valve 19.

When using the apparatus of the present invention, a suspension of fluidizible catalyst particles in gasiform material, such as hydrocarbon vapors, is caused to flow upwardly through riser 2 and outwardly through radially extending arms 6. The top of the riser is capped and the end of the radially extending arm is terminated in an elbow whose end is disposed in a downward direction. The end of this elbow is pointed toward the stripping vessel 12. The abrupt change in direction of the flow of the suspension from vertical flow to horizontal flow and then to a downward flow pattern by the internal curved surface of the elbow establishes centrifugal forces which cause a concentration of the catalyst portion of the suspension, and subsequently a separation thereof from the hydrocarbon vapors. Referring to FIG. 1, the concentrated catalyst stream passes along the curved surface of the elbow for discharge downwardly from open end 10 into the open upper end of the stripping vessel 12. The gaseous part of the suspension comprising hydrocarbon vapors is thereby centrifugally separated from entrained catalyst particles in the disengaging space provided between open end 10 of the elbow and vessel 12 and moves out from under radially-extending elbow 6 into restricted passageway 16 surrounding the radially-extending passageway 6 and providing a direct passage to the cyclones. In the passageway 16, the hydrocarbon vapors are joined by stripped hydrocarbons and stripping steam leaving the top of stripping vessel 12. These combined vapors pass upwardly through the passageway 16 which provides a rapid transmission of the cracked vapors to cyclone separator means 18 and 28 positioned in the upper portion of vessel 4. The principal purpose of restricted passageway 16 is to limit the time the cracked vapors may be exposed to elevated temperatures if they otherwise passed randomly and at lower velocity through the upper portion of vessel 4 to the cyclone separator means. By providing a direct path for the vapors to be transported out of the elevated temperature zone, they may be quenched and fractionated, in a controlled manner, in the main fractionator of the processing unit, thereby limiting undesirable thermal overcracking.

Cyclone separating means 18 and 28 may be located in the upper portion of vessel 4, as shown in FIG. 1, or externally to that vessel and it may be a single or multiple stage separating means, as would be obvious to those skilled in the art. The cyclone separating means communicates directly with each of the radially extending arms and the stripping vessels to directly conduct the vapors separated by the radially extending arms, as well as the hydrocarbons stripped from the catalyst in the strippers 12 and the steam used in the strippers. The passageway 16 assures that substantially all of the hydrocarbons separated from the hydrocarbon-catalyst suspension in the sidearms 6 are conducted directly to the cyclone separation means, thereby preventing or substantially eliminating uncontrolled thermal overcracking of the vapors outside of the riser. As set forth above, cyclone separators 18 and 28 are provided with conventional diplegs 20 and 32, respectively, which return the catalyst entrained in the gaseous vapors conducted to the cyclones to the body of the stripped catalyst in the lower portion of vessel 4. The catalyst is removed through a conduit 34 for passage to a separate regeneration vessel, not shown, for regeneration by conventional means. The separated gaseous material is removed from the cyclones by vapor outlets 22 and 30, respectively, to a chamber 24, and subsequently is conducted to a fractionation unit, not shown, by conduit 26. It will be apparent to those skilled in the art that more than the two cyclone separating means, shown in FIG. 1, may be provided in the reactor vessel 4, with each of the cyclone separating means operating substantially in the manner of the cyclone separating means 18 and 28, discussed above.

According to the present invention, the separation of catalyst from gaseous materials is achieved efficiently while, at the same time, the length of time that the gaseous materials are subjected to high reaction temperatures after separation from the catalyst is minimized. The radially-extending passageways 6, facilitating the separation of the catalyst from the gaseous vapors, and the restricted passageways 16 are principally responsible for the efficient separation with minimum thermal post-riser cracking. As will be apparent to those skilled in the art, more than the two radially-extending arms, shown in FIG. 1, may be provided in order to facilitate rapid and effective separation of the catalyst from the cracked hydrocarbons. The catalyst stripper may be an annular chamber, when several radial arms are employed, or a separate chamber provided for each radial arm. Similarly, the restricted passageway between the end of a radial arm and the inlet of the cyclone may comprise a separate conduit for each radial arm, or a header joining each radial arm with a single large conduit connecting the vapor header to the cyclone.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

I claim:

1. An apparatus for the fluid catalytic cracking of a hydrocarbon feed in a closed cyclone system comprising:
   (a) a reactor disengaging vessel containing a riser conversion zone, which is defined by a vertically disposed elongated tubular conduit having an upstream end and a downstream end, wherein said downstream end terminates within said reactor vessel;
   (b) means defining a radially extending restricted passageway having a first upstream end which includes an inlet communicating with said elongated tubular conduit at said downstream end of said tubular conduit and a second downstream end which includes means defining an opening on the bottom of said downstream end of said radially extending restricted passageway, said bottom opening adapted to discharge a stream of catalyst particles in a downward direction;
   (c) a cyclone separation means for separating entrained catalyst from gasiform material, for discharging separated catalyst into said reactor disengaging vessel, and for discharging said gasiform material externally to said disengaging vessel;
   (d) means defining an elongated catalyst stripping passageway positioned below and in open communication with the bottom opening of said radially extending restricted passageway and adapted to receive the catalyst particles into its upper end;
   (e) means defining a vertically disposed elongated restricted passageway surrounding said radially extending restricted passageway and said catalyst stripping passageway, said elongated restricted passageway being in direct fluid communication, at its upper end, with the inlet of said cyclone separation means and, at its lower end, with said catalyst stripping passageway;
   (f) a surge capacity means located on said elongated restricted passageway upstream of said cyclone separation means, wherein said surge capacity means accommodates a sudden increased rate of flow of said catalyst within said elongated restricted passageway, said surge capacity means being substantially closed during a normal rate of flow of said catalyst within said elongated restricted passageway thereby preventing catalyst flow therethrough but allowing stripping gas flow therethrough.

2. The apparatus of claim 1, wherein said surge capacity means is a means for accommodating a 2-20 fold sudden increase by volume per unit of time of the steady state rate of flow of said catalyst stream.

3. The apparatus of claim 1, wherein said surge capacity means allows stripping gas to flow from the atmosphere of said reactor disengaging vessel into said vertically disposed elongated restricted passageway during normal catalyst operation and allows catalyst to flow from said elongated passageway therethrough into said reactor atmosphere during a sudden increased rate of flow of said catalyst stream.

4. The apparatus of claim 1 wherein said surge capacity means comprises an opening in said vertically disposed elongated restricted passageway covered by a trickle valve means pivoted about a trickle valve axis which is substantially perpendicular to the longitudinal axis of said riser conversion zone.

5. An apparatus of claim 4 wherein said surge capacity mean further comprises means for pivoting a top portion of said trickle valve means about said trickle valve axis.

6. The apparatus of claim 5, further comprising means for horizontally elevating a bottom portion of said trickle valve means with respect to said elongated restricted passageway when said trickle valve is in said substantially closed position.

7. The apparatus of claim 6, wherein said means for elevating contacts said trickle valve so as to define at least one port for passing stripping gas therethrough.

8. The apparatus of claim 7, wherein said means for elevating comprises a serrated edge attached to said means defining said elongated restricted passageway.

9. The apparatus of claim 8, wherein said serrated edge is located adjacent the bottom portion of said opening in said elongated restricted passageway.

10. The apparatus of claim 8, wherein said bottom portion of said trickle valve contacts said serrated edge when said valve is in a closed position.

11. The apparatus of claim 8, wherein the horizontal dimension of said trickle valve is greater than its vertical dimension.

12. The apparatus of claim 8, wherein said surge capacity means is located in said vertically disposed elongated restricted passageway at an elevation substantially parallel and corresponding to that of said bottom opening of said radially extending restricted passageway.

13. The apparatus of claim 12, further comprising a second surge capacity means upstream of said cyclone.

14. An apparatus for the fluid catalytic cracking of a hydrocarbon feed in a closed cyclone system comprising:
   (a) a reactor disengaging vessel containing a riser conversion zone, which is defined by a vertically disposed elongated tubular conduit having an upstream end and a downstream end, wherein the downstream end terminates within said reactor vessel;
   (b) means defining a radially extending restricted passageway having a first upstream end which includes an inlet communicating with said elongated tubular conduit at said downstream end of said tubular conduit and a second downstream end which includes means defining an opening on the bottom of the downstream end of said radially extending restricted passageway, said bottom opening adapted to discharge a stream of catalyst particles in a downward direction;

(c) a cyclone for separating entrained catalyst from gasiform material, for discharging separated catalyst into said reactor disengaging vessel, and for discharging said gasiform material externally to said disengaging vessel;

(d) means defining an elongated catalyst stripping passageway positioned below and in open communication with the bottom opening of said radially extending restricted passageway and adapted to receive the catalyst particles into its upper end;

(e) means defining a vertically disposed elongated restricted passageway surrounding said radially extending restricted passageway and said catalyst stripping passageway, said elongated restricted passageway being in direct fluid communication, at its upper end, with the inlet of said cyclone separation means and, at its lower end, with said catalyst stripping passageway;

(f) a surge capacity means comprising means defining an opening located on said elongated restricted passageway and a trickle valve for covering said elongated passageway opening, wherein a top portion of said trickle valve is pivotable about a trickle valve axis which is substantially perpendicular to the longitudinal axis of the riser, said surge capacity means accommodates a sudden increased rate of flow of said catalyst within said elongated passageway, said surge capacity means being upstream of said cyclone, said surge capacity means being substantially closed during normal catalyst flow through said elongated passageway thereby preventing catalyst flow through said elongated passageway opening; and (g) a serrated edge for horizontally elevating the bottom portion of said trickle valve with respect to said elongated restricted passageway when said trickle valve is in said substantially closed position, said serrated edge being attached to said elongated passageway, wherein said serrated edge allows a stripping gas to pass through said elongated passageway opening.

* * * * *